(12) United States Patent
Roels

(10) Patent No.: US 7,385,037 B2
(45) Date of Patent: Jun. 10, 2008

(54) METHOD FOR THE PREPARATION OF GLIADIN- AND GLUTENIN-RICH FRACTIONS OUT OF GLUTEN IN AN AQUEOUS MEDIUM AND IN THE PRESENCE OF AN ACID

(75) Inventor: Stefaan Roels, Beringen (BE)

(73) Assignee: Tate & Lyle Europe, Aalst (BE)

( * ) Notice: Subject to any disclaimer, the term of this patent is extended or adjusted under 35 U.S.C. 154(b) by 347 days.

(21) Appl. No.: 10/485,884

(22) PCT Filed: Jul. 30, 2002

(86) PCT No.: PCT/EP02/08542

§ 371 (c)(1),
(2), (4) Date: Feb. 5, 2004

(87) PCT Pub. No.: WO03/013266

PCT Pub. Date: Feb. 20, 2003

(65) Prior Publication Data

US 2004/0198956 A1    Oct. 7, 2004

(30) Foreign Application Priority Data

Aug. 10, 2001  (BE) ................... 2001/0541

(51) Int. Cl.
  *C07K 1/30*  (2006.01)
  *C07K 14/415*  (2006.01)
(52) U.S. Cl. .............. 530/374; 530/370; 530/372; 530/412; 530/418; 530/427
(58) Field of Classification Search ............... 530/374, 530/370, 372, 412, 418, 427
See application file for complete search history.

(56) References Cited

U.S. PATENT DOCUMENTS 5,610,277 A * 3/1997 Bassi et al. ............... 530/374

FOREIGN PATENT DOCUMENTS

| EP | 685164 A1 | * | 12/1995 |
| EP | 992193 A1 | * | 4/2000 |
| JP | 09/169798 | | 6/1997 |
| JP | 09/176192 | | 7/1997 |
| WO | WO 97/10260 | | 3/1997 |

OTHER PUBLICATIONS

Berot et al.; *Pilot scale preparation of wheat gluten protein fractions I-Influence of process parameters on their protein composition*: International Journal of Food Science and Technology, 1994; vol. 29; pp. 489-502.
Goforth & Finney; *Separation of Glutenin from Gliadin by Ultracentrifugation*; Communication to the Editor, Ceareal Chemistry; 1976; Amer. Assn. of Cereal Chemists; vol. 53, No. 4: pp. 608-612.

* cited by examiner

*Primary Examiner*—Jon Weber
*Assistant Examiner*—Abdel A Mohamed
(74) *Attorney, Agent, or Firm*—James Creighton Wray; Clifford D. Hyra

(57) ABSTRACT

Method for the preparation of gliadin- and glutenin-rich fractions from gluten in an aqueous medium and in the presence of an acid, wherein the gluten are dispersed continuously or not in water up to a dry substance varying between 5 and 30%, by which the pH of the dispersion is monitored between 4.4 and 4.8 and the gluten-water mixture is submitted to shearing actions, through which the dispersion, continuously or not, can be fractionated in gliadin- and glutenin-rich fractions, by which a single gliadin-rich fraction with a gliadin/glutenin ratio of at least 2.5 is obtained, and a single glutenin-rich fraction with a gliadin/glutenin ratio of less than 0.8 is obtained.

11 Claims, 2 Drawing Sheets

METHOD FOR THE PREPARATION OF GLIADIN- AND GLUTENIN-RICH FRACTIONS OUT OF GLUTEN IN AN AQUEOUS MEDIUM AND IN THE PRESENCE OF AN ACID

This application is a 371 of PCT/EP02/08542 filed Jul. 30, 2002, which claims benefit to Belgian Application No. 2001/0541 filed Aug. 10, 2001.

BACKGROUND OF THE INVENTION

The present invention concerns an improved method for the preparation of gliadin- and glutenin-rich fractions out of gluten in an aqueous medium and in the presence of an acid.

In the patent and scientific literature, several methods have already been described for the separation of wheat gluten into gliadin- and glutenin-rich fractions. Also the use of these fractions has already been the subject of a number of patent and scientific publications.

On a laboratory scale, many techniques using different solvents and other conditions have been studied to separate the two fractions. In the book "Protéines végétales" (1985), p. 161-210, Popineau reported a detailed review of these techniques but, in most cases, these techniques can not be extrapolated to an industrial scale because they generally use solvents which are not allowed in food preparation and they include a step such as preparative chromatograph which, although suitable for pharmaceutical usage, is too expensive to be used in the food industry.

Among the solvents allowed for use in the preparation of food components, water-alcohol mixtures and acetic acid solutions were tested at a laboratory scale for their ability to separate the protein fractions.

In EP 685 164, an extraction method is described by which an aqueous solution of ethanol having a concentration of 30 to 70% by volume, an aqueous solution of isopropyl alcohol or n-propanol having a concentration of 10 to 20% by volume, or an aqueous solution of acetone having a concentration of 20 to 50% by volume is used to prepare a fraction having a gliadin concentration of as high as 80% or above. The extraction can be performed by means of an acidic aqueous solution of ethanol having a concentration of 5 to 30% by volume and a ph of 3.5 to 5.5 also, to give a gliadin fraction having a concentration of 50% or above. Among the acids which can be used belong acetic, citric, malic, lactic, adipic, fumaric, tartaric, gluconic, phosphoric and phytic acid.

Because the use of flammable solvents requires some additional saftty measures, it is considered as advantageous to have a process where no such solvents are needed. Such a process is described in "Industries Alimentares et Agricoles" (1974) by C. de Meester, by which 0.01-0.1 M acetic acid solutions are used to extract proteins from vital wheat gluten. After an extraction period ranging from 1 to 8 hours, the final yields are 20-55%. The soluble fraction, the gliadin-rich one, was recovered by precipitation at neutral pH. Because the insolubilised gliadins are very sticky, such a technique is not very suitable for industrial application and the protein precipitation stage must be avoided in the recovery process. This method was elaborated on lab scale, but is not workable on an industrial scale.

An other solvent-free process is described in WO 9710260. This application describes a method for fractionating wheat gluten. According to this method, wheat gluten is first dispersed in an aqueous acidic medium at a first acidic pH in the presence of a reducing agent, to reduce disulphide bonds in the gluten protein. Then the pH of the dispersion is raised to a second level above said first pH, causing glutenin to precipitate while leaving gliadin suspended in the dispersion and finally the glutenin and gliadin are separated into the respective fractions.

Also EP 992 193 refers to an aqueous extraction method by which an aqueous solution of pH smaller or equal to 4.5 and comprising 0.1 to 10% weight/volume of at least one organic acid is used. Among the acids that can be selected there is mentioned: citric, lactic, malic, acetic acid, but also phosphoric acid and salts thereof. This application provides no further details on how such an aqueous extraction is performed.

By Bérot et al., in "Intern. Journal of Food Science & Technology" (1994), p. 489-502, a pilot scale process for fractionating gluten, using acid aqueous solutions is described. According to this publication, wheat gluten and a dilute acid solution are mixed in a high shear mixer for two minutes, and the stirred continuously for 30 minutes. The aqueous solvent to gluten ratio varied between 7:1 and 16:1 (v/w). The soluble gliadin-rich fraction was separated by means of a Westfalia horizontal centrifuge decanter and the residue was then again mixed with water or with dilute acid and submitted to a second centrifugation step. This resulted in an insoluble glutenin-rich fraction and the intermediate fraction. The overall characteristics of the intermediate fraction were not far from these of wheat gluten.

This process, although providing a gliadin-rich fraction, is less attractive because the intermediate fraction is obtained as a by-product. This by-product is considered as an important disadvantage with regard to the yield.

Also the processing set-up is quite complicated and deserves to be simplified, preferably without loss of functional properties of the fractionated material.

Apart from the complicated nature of the Bérot-process, it is observed that the intermiediate fraction can not be reprocessed via back-mixing with fresh gluten. Indeed, it was observed that re-circulation of this intermediate product resulted in the reduction in purity and quality of the fractions.

SUMMARY OF THE INVENTION

The purpose of the invention is to provide in a method for the preparation of gliadin- and glutenin-rich fractions out of gluten in an aqueous medium and in the presence of an acid, which doesn't show the abovementioned disadvantages.

This purpose is achieved by providing for a method for the preparation of gliadin- and glutening-rich fractions out of gluten in an aqueous medium and in the presence of an acid, but by which the gluten are dispersed continuously or not in water up to a dry substance varying between 5 and 30%, by which the pH of the dispersion is monitored between 4.4 and 4.8, and the gluten-water mixture is submitted to shearing actions, through which the dispersion, continuously or not, can be fractionated in gliadin- and glutenin-rich fractions, by which a single gliadin-rich fraction with a gliadin/glutenin ratio of at least 2.5 is obtained, and a single glutenin-rich fraction with a gliadin/glutenin ratio of less than 0.8 is obtained.

In a preferred method according to the invention, the gluten-water mixture is submitted to shearing actions, in such a way that the volume of the sediment of the gluten dispersion after fractionation, as determined in the "spin test", varies between 15 and 35%.

More preferably, in a method according to the invention said volume of the sediment varies between 20 and 30%.

In an other preferred method according to the invention said sediment comprises between 48 and 58% of the dry substance present in the gluten dispersion.

More preferably, in a method according to the invention, said sediment comprises between 50 and 55% of the dry substance present in the gluten dispersion.

In still another preferred method according to the invention, the pH of the dispersion is monitored between 4.5 and 4.7.

Preferably, in a method according to the invention, the gluten can be dispersed by the mixing of the gluten with water using mixing means during a period of less than 60 minutes with a speed between 500 and 3000 rpm.

More preferably, in a method according to the invention, the mixing is performed during a period of less than 30 minutes.

In a preferred method according to the invention, the fractionation of the dispersion is performed by means of centrifugal means, e.g. by means of a centrifuge with automatic self-desludging centrifuges or by means of decanter centrifuges.

In an other preferred method according to the invention, the dry substance of the dispersion varies between 10 and 15%.

In still another preferred method according to the invention, as acid phosphoric acid is used.

The invention will now be described more in detail. The purpose of this detailed description is to give a more clarifying view of the invention and to indicate further advantages and details of this invention. Furthermore, clarifying examples will be used. This detailed description and the clarifying examples can in no sense be interpreted as a restriction of the field of application of the invention or of the patent rights as demanded in the claims.

BRIEF DESCRIPTION OF THE DRAWINGS

In this detailed description, reference will be made to figures, by which.

DETAILED DESCRIPTION OF THE PREFERRED EMBODIMENTS

Acidification can be preformed by means of an organic or inorganic acid. Typical acids that can be used are, although they are not limiting, e.g. acetic acid, citric acid, lactic acid, succinic acid, malic acid, tartaric acid, fumaric acid, hydrochloric acid, sulphuric acid and phosphoric acid. Preferably, phosphoric acid is used. The pH of the dispersion is preferably monitored between 4.5 and 4.7, and more preferably around 4.6.

Gluten concentration in the dispersion varies between 5-30% w/v, concentrations between 10 and 15% w/v being preferred. The wheat gluten can be dispersed by mixing the gluten with water using e.g. a mixing blade with knives, or with another configuration, rotating at 500-3000 rpm for a time sufficient to obtain a dispersion that can be separated into the fractions of the invention. Typical mixing times are less than 1 hour, preferably less than 30 minutes.

Mechanical input and mixing conditions must be selected in such a way that the obtained dispersion can be separated into a gliadin-rich fraction of which the gliadin/glutenin ratio is at least 2.5 and a glutenin-rich fraction showing a gliadin/glutening ratio of less than 0.8. In a standard gluten composition gliadin/glutenin ratios vary between 1 and 1.3, typically. These different wheat protein classes are determined by means of the analytical method disclosed hereafter.

This method uses the different solubility characteristics of the wheat protein classes in different solvents to separate gliadins, glutenings, albumins and globulins. Distribution of protein in the different solvents is quantified by Kjeldahl analysis.

Figure 2:
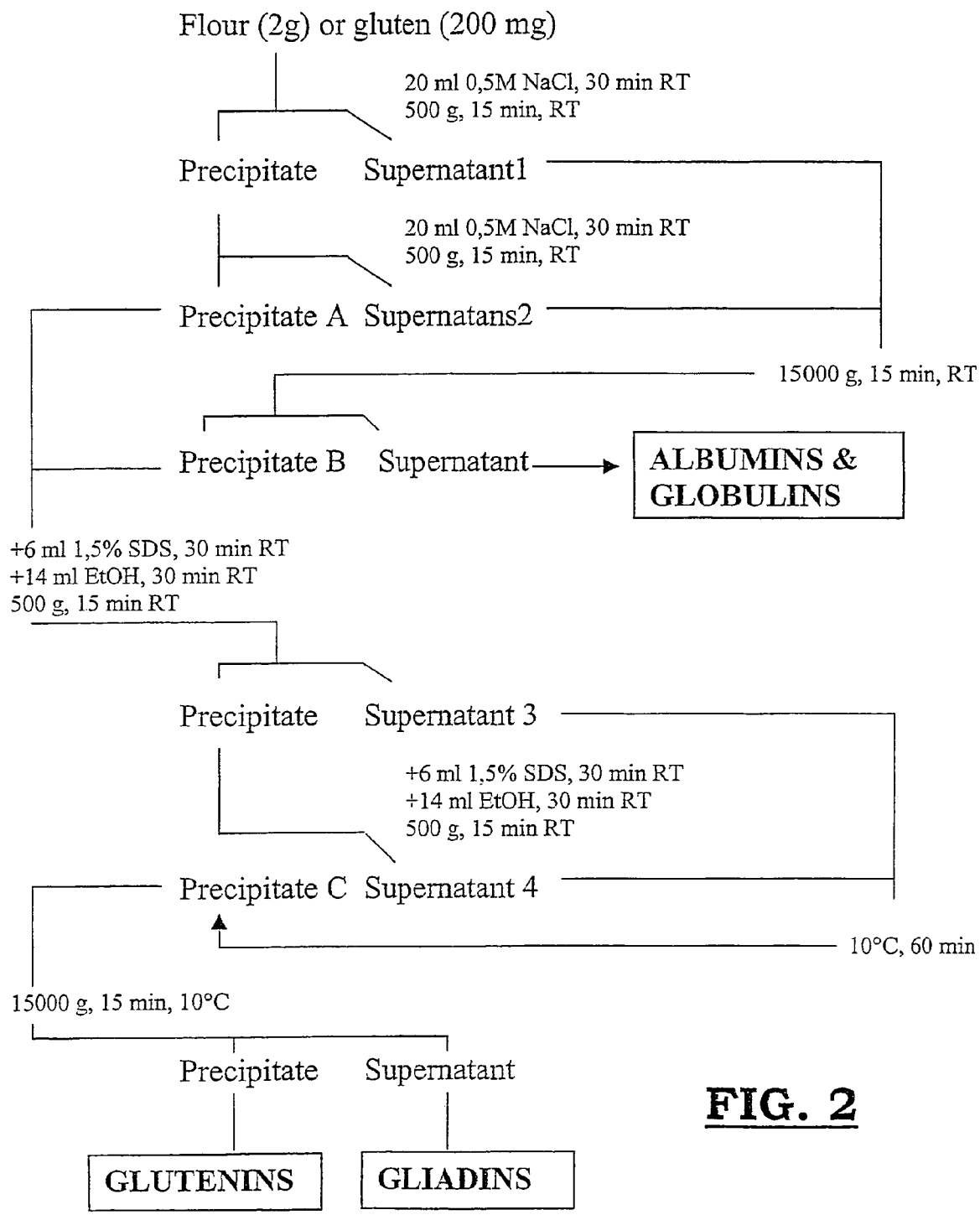
FIG. 2 is an outlining of an extraction procedure to separate gliadins, glutenins, albumins and globulins.

Equipment:
polypropylene centrifuge tubes of 40 ml
centrifuge (able to spin at 15000 g)
analytical balance
0.5 M NaCl
1.5% SDS solution
95% ethanol
incubation chamber at 10° C.
Kjeldahl apparatus
Kjeldahl tablets
Method (as Shown in FIG. 2):
All extractions are for 30 minutes at room temperature.
Weigh a sample in a PP-centnfuge tube of ±40 ml. For flour 2 g, for gluten 200 mg, for process samples the amount corresponding to ±150-160 mg of protein.
Add 20 ml 0.5 M NaCl. Stir for 30 minutes at room temperature (RT). After extraction, centrifuge at 500 g for 15 minutes at RT. Carefully decant the supernatant in a clean PP-tube. Add another 20 ml of 0.5 M NaCl to the residue (precipitate A) and repeat the extraction and centrifugation. Combine this second supernatant with the first and then centrifuge at 15000 g for 15 minutes at RT. The supernatant contains the albumins and globulins.
To the residue (precipitate B) is added 6 ml 1.5% SDS solution. The mixture is homogenised and combined with precipitate A. Extraction is for 30 minutes at RT. 14 ml of absolute ethanol is then added drop wise and the mixture is stirred for another 30 minutes at RT. After centrifugation at RT for 15 minutes at 500 g, a precipitate and supernatant 3 are obtained. This complete procedure is repeated on the obtained precipitate, yielding precipitate C and supernatant 4.
Supernatants 3 and 4 are combined in a small beaker and kept in an incubation chamber at 10° C. for 60 minutes. A fine precipitate forms and this mixture is then poured into the centrifuge tube containing precipitate C. The mixture is immediately transferred to the centrifuge and spun at 15000 g for 15 minutes at 10° C. This yields a supernatant containing gliadins and a precipitate containing glutenins.

Kjeldahl Determination:
The solutions containing the albumins/globulins and gliadins (±40 ml) are quantitatively transferred to destruction flasks (750 ml). A tablet, 14 ml of concentrated sulphuric acid and 3 drops of octanol (antifoam) are added and samples (about 15 ml) are transferred to a Kjeldahl tube and nitrogen is determined by the standard Kjeldahl method.

The glutenin fraction is freeze dried and nitrogen content is determined as in dry products.

The results are reported as the amount of protein found in the different classes and expressed as a percentage of the recovered protein.

There has been observed that abovementioned gliadin- and glutenin-rich fractions can be obtained after centrifugation, when the input of mechanical energy results in dispersions showing specific sediment volume values as determined by means of a "spin test".

This "spin test" uses a standard lab centrifuge, and centrifugal tubes of 15 ml, with 0.1 ml scale divisions. The tubes are then filled with 10 ml of the gluten dispersion. The tubes are centrifuged during 10 minutes at 1800 g. The volume of the sediment, expressed in % volume, is then determined by the ratio of the sediment in ml and the volume of the centrifuge tubes in ml, multiplied by 100.

Suitable dispersions are then characterised by a sediment volume varying between 15 and 35%, preferably between 20 and 30%. The sediment thereby comprises between 48 and 58%, more preferably between 50 and 55% of the dry substance present in the gluten dispersion. The dry substance of the dispersions may vary between 5 and 30% dry substance, preferably between 10 and 15% dry substance. If shear intensity and/or mixing time are not adapted, then it is not possible to obtain fractions corresponding to the above values.

The separation of the dispersion is realised by centrifugal means, e.g. by means of self-desludging centrifuges or by means of decanter centrifuges. The centrifuge equipment is used under optimal separation conditions.

Figure 1:
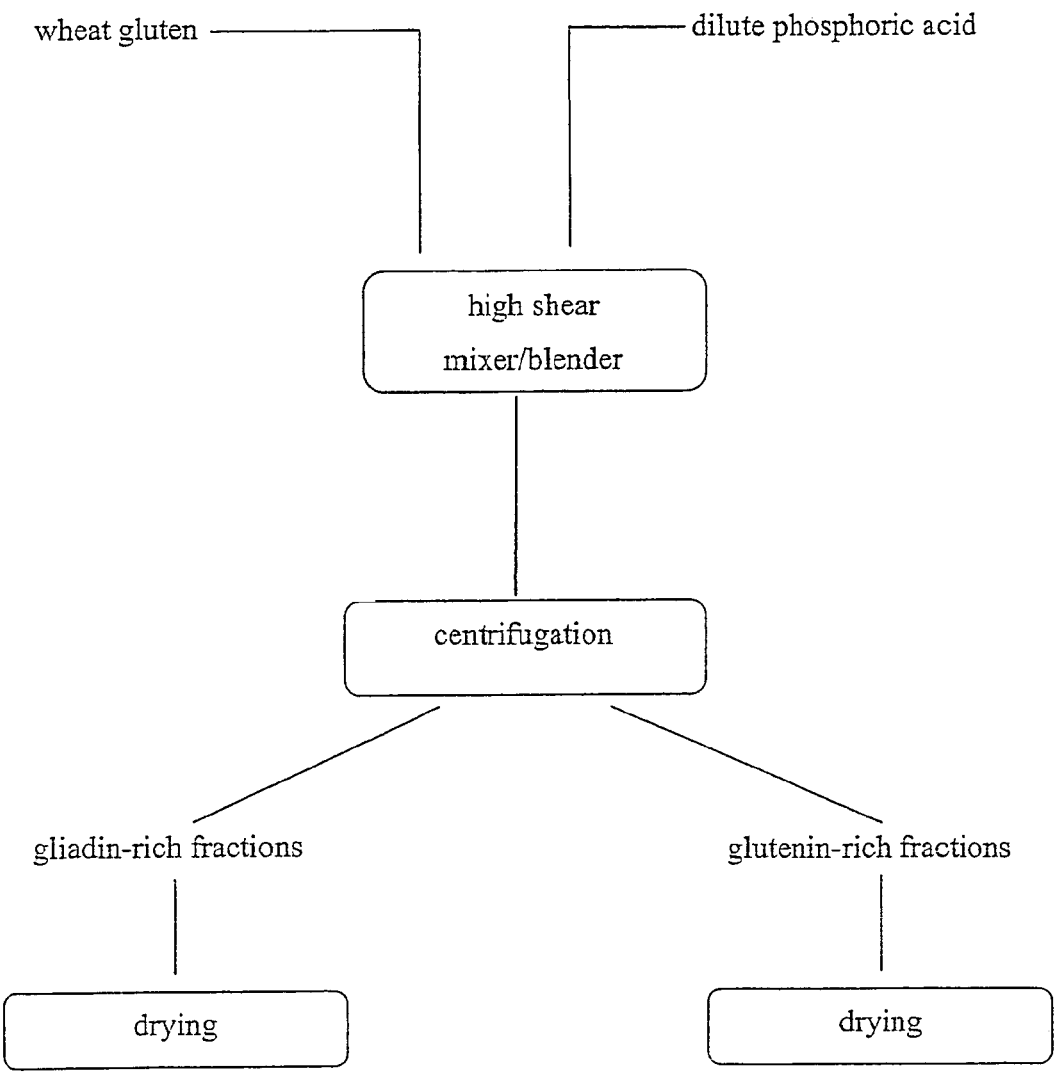
FIG. 1 is a schematically representation of a typical fractionation process according to the invention.

A typical fractionation process according to the invention is typically performed by a temperature varying between 10 and 40° C. According to the scheme as shown in FIG. 1, dry wheat gluten is mixed with an acidic solution in a mixing tank, while pH is continuously monitored by a pH-stat. The gluten dispersion thus obtained is then submitted to a centrifugal separation by which a gliadin-rich and a glutenin-rich fraction is obtained. The gliadin-rich fraction can be concentrated by means of an ultra filtration concentrating step, before drying. The gliadin-rich fraction can then be dried using any known method, spray drying being preferred. The permeate can be re-circulated and used in the mixing step. The glutenin-rich fraction is also dried.

EXAMPLES

Example 1

Batch Preparation:

Commercial dry wheat gluten is used as the starting material. In a vessel containing 225 l tap water and 450 g of phosphoric acid (75%), 25 kg commercial wheat gluten are added with a screw (Katrion) via a tube directly into the vortex of the stirred dispersant. The pH is constantly monitored using a pH-stat, and maintained at pH=4.6. The gluten is dispersed within a period of 10 minutes and mixing is continued until a dispersion is obtained containing between 45 and 50% of the material in the disperse phase. This corresponds with a "spin test" value of 27%.

The mixing is performed by means of a high shear mixer. The thus obtained dispersion is separated by means of a decanter centrifuge (Westfalia CAI50) by which the settings were adjusted to obtain about 45% of the dry substance in the supernatant of the decanter.

The gliadin-rich fraction was then submitted to a spray-drying step. This fraction has a protein content of 80%. The gliadin content as 68% of the total protein content, compared with 45-48% for native gluten. The gliadin/glutenin ratio was 3.1.

In table 1, a comparison of the composition has been made between samples of gluten fractions obtained by means of the method of Bérot (which are samples which were received from Popineau et Bérot) and samples obtained by the process according to the invention. All samples have been analysed by means of the above described method.

|  | Method according to Bérot | | | |
|---|---|---|---|---|
|  | gluten | gliadin | intermediate | glutenin |
| albumin/globulin | 11.0-13.3 | 10.5 | 7.2 | 6.1 |
| gliadin | 45.3-48.7 | 59.1 | 39.1 | 31 |
| glutenin | 37.0-45.4 | 30.4 | 53.7 | 62.9 |
| Ratio glia/glu | 1.08-1.28 | 1.94 | 0.73 | 0.49 |

TABLE 1

Composition of samples obtained by the method according to Bérot and Amylum as determined with the abovementioned described method (test a).

| | Method according to Amylum | | | |
|---|---|---|---|---|
| gluten | ABe gliadin | ABe glutenin | Afr gliadin | AFr glutenin |
| 11.0-13.3 | 10.4 | 8.8 | 10.4 | 6.9 |
| 45.3-48.7 | 67.7 | 35.6 | 67.9 | 35.3 |
| 37.0-47.4 | 21.9 | 55.6 | 21.6 | 57.7 |
| 1.08-1.28 | 3.1 | 0.64 | 3.13 | 0.61 |

ABe: samples obtained out of wheat gluten made in Amylum Belgium
AFr: samples obtained out of wheat gluten made in Amylum France
Values are expressed as % of the protein fraction in the samples.

Table 1: Composition of samples obtained by the method according to Bérot and Amylum as determined with the abovementioned described method (test a). Values expressed as % of the total protein fraction in the samples.

Example 2

Continue Preparation:

In a vessel containing 225 l tap water and 450 g phosphoric acid (75%), 25 kg of commercial wheat gluten is added with a screw (Katron) via a tube directly into the vortex of the stirred dispersant. The pH is constantly monitored using a pH-stat, and maintained at pH=4.6. The gluten is dispersed within a period of 10 minutes and mixing is continued until a dispersion is obtained having a "spin test" value of 25%. The necessary shear is provided to reach such a value within 20 minutes after that the gluten was dispersed.

Then additional water and gluten are constantly added in the vortex of the stirred dispersion, while the pH is constantly monitored and maintained at pH=4.6, by adding phosphoric acid. The addition rate is 20 kg gluten and 200 l water per hour. The overflow of the vessel is led into a stirred buffering vessel of 60 l, which is used to constantly feed the decanter (Westfalia CA150). The quantities added correspond to the quantities processed via the decanter (feed rate 20 l/h; 2500 rpm; differential 10-15). The gliadin fraction thus obtained has a dry substance content of 6% and is further processed by means of an ultra filtration stage. The permeate water is used to disperse gluten in the first stirring tank. The retentate, having a dry substance content of about 10% is dried by means of spray drying.

The glutenin-rich fraction is neutralised with sodium carbonate to pH=7, washed with water and then dried in a ring drier.

The invention claimed is:

1. A method for the preparation of gliadin- and glutenin-rich fractions from gluten in an aqueous medium and in the presence of an acid, consisting of:

continuously or discontinuously dispersing the gluten in water up to a dry matter content varying between 5 and 30% w/v, monitoring the pH of the dispersion between 4.4 and 4.8, and submitting the gluten-water mixture to shearing actions, through which the dispersion is fractionated, continuously or discontinuously, in gliadin- and glutenin-rich fractions, obtaining a single gliadin-rich fraction with a gliadin/glutenin ratio of at least 2.5, and a single glutenin-rich fraction with a gliadin/glutenin ratio of less than 0.8.

2. The method according to claim 1, wherein the monitoring the pH of the dispersion is done between 4.5 and 4.7.

3. The method according to claim 1, wherein the fractionation of the dispersion is performed by means of centrifugal means, by means of a centrifuge with automatic self-desludging centrifuges or by means of decanter centrifuges.

4. The method according to claim 1, wherein the dry matter content of the dispersion varies between 10 and 15% w/v.

5. The method according to claim 1, wherein said acid is phosphoric acid.

6. The method according to claim 1, wherein the dispersing the gluten in water is done by the mixing of the gluten with water, using mixing means during a period of less than 60 minutes with a speed between 500 and 3000 rpm.

7. The method according to claim 6, wherein the mixing is performed during a period of less than 30 minutes.

8. The method according to claim 1, wherein the step of submitting the gluten-water mixture to shearing actions, is in such a way that a volume of sediment of the gluten dispersion after fractionation, as determined in a "spin test", varies between 15 and 35% w/v.

9. The method according to claim 8, wherein said volume of sediment varies between 20 and 30% w/v.

10. The method according to claim 8, wherein said sediment comprises between 48 and 58% w/v of the dry matter content present in the gluten dispersion.

11. The method according to claim 10, wherein said sediment comprises between 50 and 55% w/v of the dry matter content present in the gluten dispersion.

* * * * *